Aug. 16, 1932.  J. A. E. CARLSON  1,872,119
LAWN MOWER
Filed Nov. 10, 1927    2 Sheets-Sheet 1

INVENTOR.
John A. E. Carlson
BY
ATTORNEY.

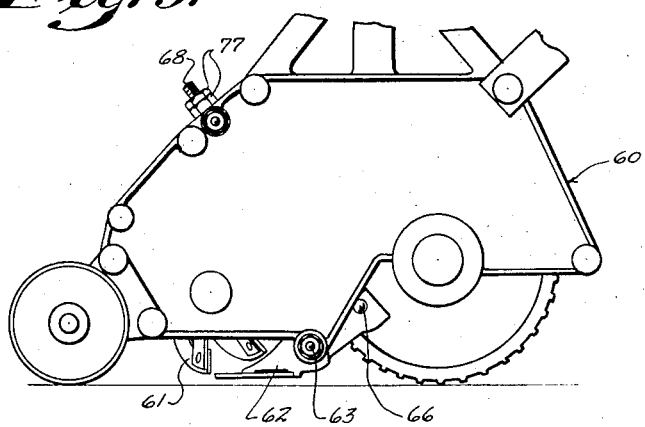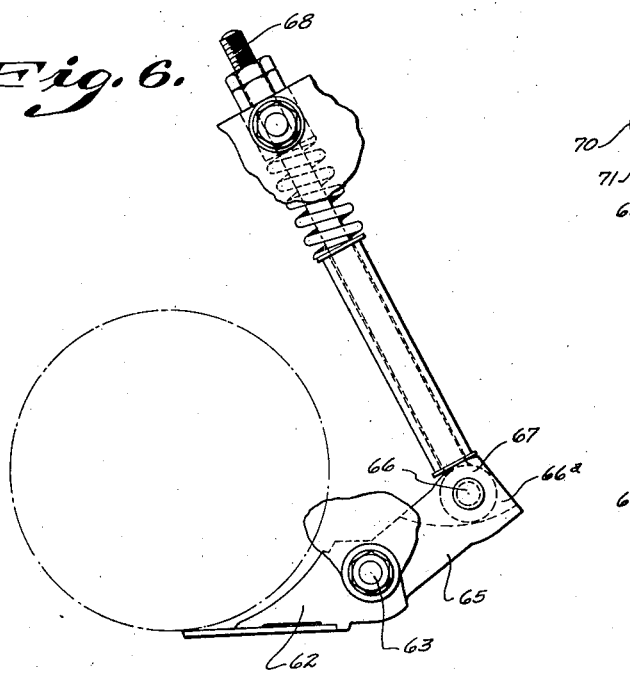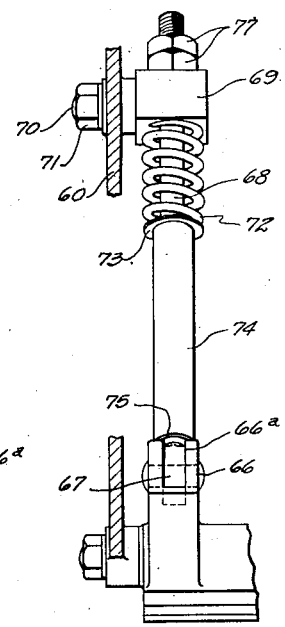

Patented Aug. 16, 1932

1,872,119

UNITED STATES PATENT OFFICE

JOHN A. E. CARLSON, OF RACINE, WISCONSIN, ASSIGNOR TO JACOBSEN MFG. COMPANY, OF RACINE, WISCONSIN, A CORPORATION OF WISCONSIN

LAWN-MOWER

Application filed November 10, 1927. Serial No. 232,227.

This invention relates to power driven mowers such as are used for cutting lawns. The present application is a continuation in part of my co-pending application for power driven mowers filed July 12, 1926, Serial No. 121,764, patented June 24, 1930, Number 1,767,510, as to the mounting and adjustment mechanism for the fixed knife of the mower shown in Figures 1 to 4, inclusive, of the drawings of this application and as to the features in common between the construction shown in Figures 1 to 4 and the construction shown in Figures 5 to 7.

One object of the invention is to provide, in a machine of the character referred to, improved means for yieldably holding the bed knife in its position of adjustment with respect to the cutting reel thereby protecting the cutting reel and the bed knife against injury.

In carrying out the present invention the bed knife is adjustably mounted for movement toward and away from the cutting reel and yieldable means is provided for urging the bed knife toward the cutting reel and for resiliently resisting movement of the bed knife away from the cutting reel. Positively acting means is provided for positively limiting the movement of the bed knife toward the cutting reel. This organization has the advantage of maintaining, without vibration, the proper adjustment of the bed knife with respect to the cutting reel and yet fully protects the cutting reel and bed knife from injury when stones or other hard or rigid objects are caught between the blades and the bed knife, for, under such circumstances, the yieldable means permits the bed knife to move away from the cutting reel whereby the cutting mechanism clears itself of the stone or other hard object.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 5 is a fragmentary view in side elevation showing a slightly different form of invention;

Figure 6 is a fragmentary view in side elevation showing one of the spring take-ups employed for the bed knife in the form shown in Figure 5; and Figure 7 is a view in elevation and partly in cross section looking toward the left in Figure 6.

Figure 1:
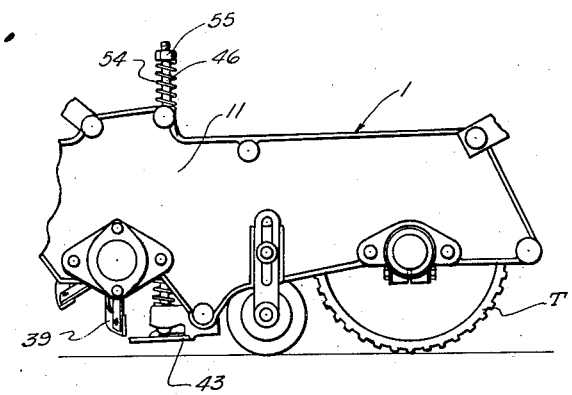
Figure 1 is a fragmentary view in side elevation showing a portion of a lawn mower having its bed knife mounted in accordance with the present invention.
Figure 3:
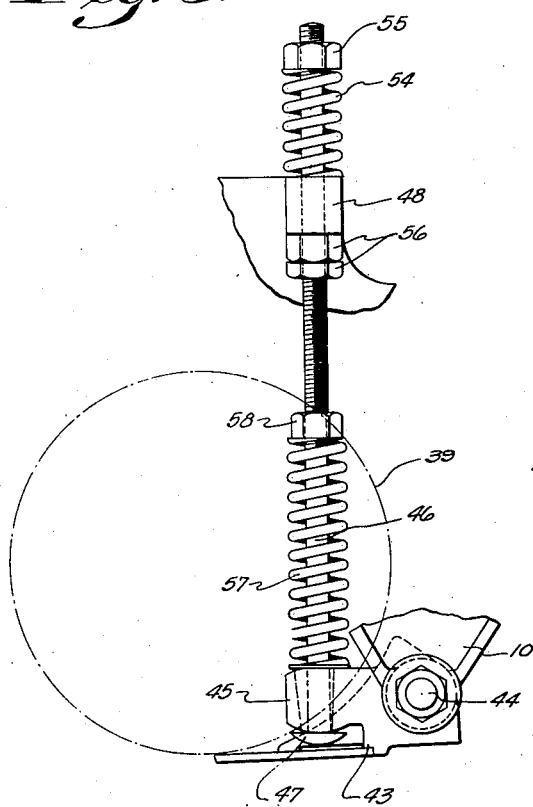
Figure 3 is a fragmentary detail view showing the mechanism at one side of the frame for controlling the position of the bed knife.
Figure 4:
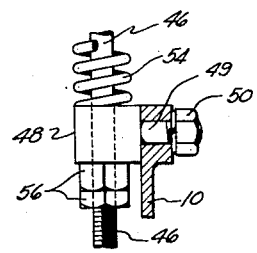
Figure 4 is a fragmentary view of a portion of the mechanism of Figure 3, the view being taken from the right of Figure 3 and part of the mower being shown in cross section to show how the mechanism is secured thereto.

Referring to the drawings, and more particularly to Figures 1 to 4, inclusive, the numeral 1 designates generally a portion of a power driven lawn mower. The details of the general construction of this lawn mower form no part of this invention and reference is made to the co-pending application of John A. E. Carlson for power driven lawn mowers, filed July 12, 1926, Serial No. 121,-764, for a full disclosure of these features.

For the purpose of this invention it is sufficient to understand that the frame 1 comprises side frame members 10 and 11 suitably held in fixed spaced relation and suitably supported on the traction means T. On these side frame members 10 and 11, a cutting reel or element 39 of usual construction is rotatably mounted.

Figure 2:
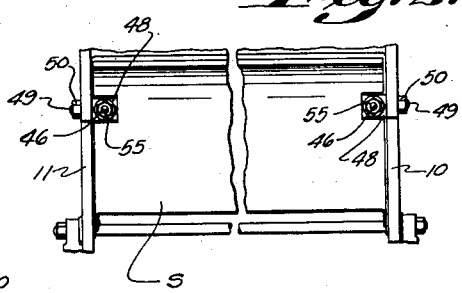
Figure 2 is a fragmentary plan view of the forward end of the lawn mower shown in Figure 1, parts being omitted for the sake of simplicity in illustration.

A suitable bed knife 43 is pivotally mounted on the frame members 10 and 11 as indicated at 44. Apertured lugs 45 are integrally formed with or otherwise rigidly connected to the bed knife 43 and receive the lower ends of take-up rods 46, the rods being loosely fitted in the openings of the lugs and having heads 47 at their lower ends engaging the undersides of the lugs. The take-up rods 46 are loosely extended through bearing blocks 48 which have studs 49 integral therewith or otherwise rigidly connected thereto, the studs 49 being fitted in openings provided therefor in the frame members and being secured in such openings by means of nuts 50. One such take-up rod 46 is provided at each side of the machine as shown in Figure 2. In Figure 2, S designates a shield within which the cutting reel operates.

Yieldable means is provided for urging the take-up rods upwardly and consequently for advancing the bed knife toward the cutting reel and this yieldable means preferably comprises a spring 54 on each take-up rod, each spring 54 having its lower end engaging the associated bearing block 48 and having its upper end abutting a nut 55 threaded on its take-up rod 46. The upward movement of each take-up rod is limited by means of nuts 56 threaded on the take-up rod and engaging the underside of the associated bearing block 48. These nuts 56 serve to limit positively movement of the take-up rods in the direction which advances the bed knife toward the cutting reel.

Each lug 45 is yieldably held engaged with the head 47 of its take-up rod 46 by means of a compression coil spring 57 encircling the rod 46 and held against the lug 45 by means of a nut 58.

With this construction the bed knife is mounted for adjustment toward and away from the cutting reel and it is resiliently or yieldably held in proper cutting relation with respect to the reel. The maintenance of the bed knife in its proper position is due in part to the action of the spring 54 and in part to the action of the nuts 56, the spring 54 pulling upwardly on the take-up rod 46 to urge the bed knife toward the cutting reel and the nuts 56 positively limiting or stopping the upward movement of the take-up rods. The springs 54 thus act to preserve the adjustment by dampening vibration and they have the further and important advantage of protecting the bed knife and the cutting reel. Thus, if a stone or any hard or rigid object is caught in the reel so as to be interposed between one of the knives or blades of the reel and the bed knife, the bed knife will move away from the cutting reel, the springs 54 permitting this movement of the bed knife, and the obstruction will be thrown out from between the knives and damage or injury precluded. As soon as the cutting mechanism is cleared of the obstruction the bed knife is returned to and held in its proper position by virtue of the combined action of the springs 54 and the nuts 56.

In the form of invention shown in Figures 5, 6, and 7, the lawn mower is designated at 60 and is of the type shown in the co-pending application of John A. E. Carlson, for power mower, filed June 13, 1927, Serial No. 198,317 now Patent No. 1,734,713, dated November 5, 1929. This lawn mower has the usual cutting reel 61 and a bed knife 62 pivotally mounted on the frame as at 63 so as to be adjustable toward and away from the knives or blades of the cutting reel. In this construction a lug 65 is rigidly connected with the bed knife 62 at each side of the machine but projects rearwardly therefrom, that is, extends on the opposite side of the pivot 63 from the bed knife 62. The rearward end of each lug 65 is slotted as at 66ª to receive the eye 67 provided at the lower end of a take-up rod 68. A pivot pin 66 pivotally fastens the eye 67 to the slotted end 66ª of the lug. Each take-up rod 68 is angled forwardly and upwardly and slidably extends through an opening provided therefor in a bearing block 69 having a stud 70 rigid therewith and extended through an opening provided therefor in the associated frame member of the lawn mower and secured in such opening by a nut 71.

For advancing the bed knife toward the cutting reel an expansible coil spring 72 is mounted on the upper portion of each take-up rod 68 and has its upper end engaging its bearing block 69 and its lower end engaging a washer 73 abutting the upper end of an abutment sleeve 74 fitted on the rod 68 and having its lower end engaging a washer 75 interposed between the abutment sleeve and the adjacent lug 65. The downward movement of each take-up rod and consequently the advance of the bed knife toward the cutting reel is limited by means of nuts 77 threaded on the upper ends of the rods and engaging the upper portion of the blocks 69.

In this form of the invention as in the other, the bed knife is advanced toward the cutting reel under the action of yieldable means so that it moves away from the cutting reel automatically when a stone or other hard object is caught between the knives of the cutting reel and the bed knife. However, as soon as the cutting mechanism is cleared of the hard object the proper cutting relation between the bed knife and the cutting reel is resumed under the combined action of the springs 72 and the nuts 77.

The invention claimed is:

1. A lawn mower comprising a cutting reel, a bed knife pivoted on the lawn mower and movable toward and away from the cutting reel, a take-up rod connected to the bed knife, a bearing member mounted on the lawn mower and through which the take-up rod is freely movable, a coil spring mounted on the take-up rod and having its outer end engaging the bearing member, an abutment on the take-up rod engaging the inner end of the coil spring, said take-up rod projecting beyond the bearing member, and a nut threaded on the projecting portion of the take-up rod and cooperable with the bearing member for the dual purpose of adjusting the take-up rod to appropriately tension the spring and for positively limiting the movement of the bed knife toward the cutting reel.

2. A lawn mower having a cutting reel, a bed knife positively and pivotally mounted on the lawn mower and movable toward and away from the cutting reel, a single take-up rod connected to the bed knife adjacent each end thereof, a bearing member on the lawn mower through which the take-up rod is freely movable, spring means coacting with the bearing member and with the take-up rod for advancing the bed knife toward the cutting reel and means on the take-up rod engageable with the bearing member for positively limiting the movement of the take-up rod in the direction which advances the bed knife toward the cutting reel.

3. A lawn mower comprising a cutting reel, a bed knife positively and pivotally mounted on the lawn mower and movable toward and away from the cutting reel, a take-up rod connected to the bed knife, a bearing member mounted on the lawn mower and through which the take-up rod is freely movable, a coil spring mounted on the take-up rod and engaging the bearing member, an abutment on the take-up rod also engaging the coil spring and coacting with the bearing member to tension the same to cause the coil spring to advance the bed knife toward the cutting reel and a nut threaded on the take-up rod and engageable with the bearing member to limit positively the movement of the take-up rod in the direction which advances the bed knife toward the cutting reel.

4. A lawn mower comprising a cutting reel, a bed knife pivoted on the lawn mower and movable toward and away from the cutting reel, a lug rigid with the bed knife and extending on the side of the pivotal axis of the knife opposite the edge thereof, a take-up rod having one end connected to the lug, a bearing member on the lawn mower through which the take-up rod is freely movable, an abutment on the take-up rod, a coil spring encircling the take-up rod and compressed between the abutment and the bearing member and operating to urge the bed knife toward the cutting reel, and an adjustable abutment on the take-up rod engageable with the bearing member to positively limit the movement of the take-up rod in the direction which advances the bed knife toward the cutting reel and to adjust the take-up rod relative to the bearing member to appropriately tension said spring.

In witness whereof, I hereto affix my signature.

JOHN A. E. CARLSON.